March 2, 1926.

A. Y. DODGE 1,574,957

BRAKE

Filed August 17, 1925

INVENTOR
ADIEL Y. DODGE
BY
ATTORNEY

Patented Mar. 2, 1926.

1,574,957

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

BRAKE.

Application filed August 17, 1925. Serial No. 50,658.

*To all whom it may concern:*

Be it known that I, ADIEL Y. DODGE, a citizen of the United States, residing in South Bend, in the county of St. Joseph and State of Indiana, have invented a certain new and useful Improvement in Brakes, of which the following is a specification.

This invention relates to brakes, and is illustrated as embodied in a backing plate for an automobile brake. An object of the invention is to prevent the building up of vibrations in the plate, such as would otherwise cause a drumming noise, by slotting the plate radially between the point where it is clamped by the brake anchor and the point where it is clamped by the brake-applying means.

The invention is herein described as embodied in the plate shown in the accompanying drawing, in which.

Figure 1:
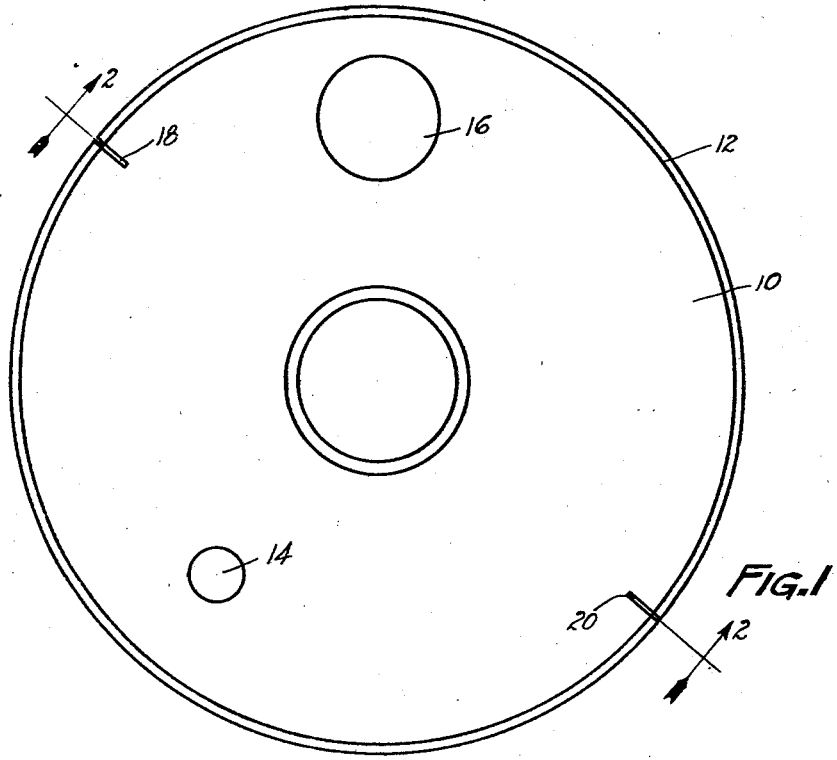
Fig. 1 is a front elevation of the plate.
Figure 2:
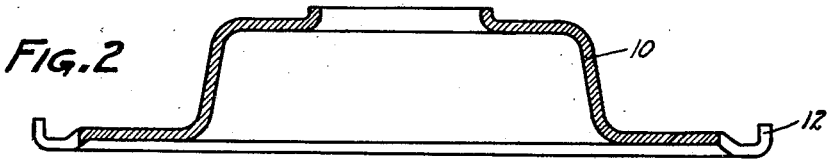
Fig. 2 is a section therethrough on the line 2—2 of Fig. 1.

While the invention is applicable to backing plates for any brake, I have shown a plate intended for a three-shoe single-anchor brake of the type shown in application No. 747,669, filed November 3, 1924. The plate itself appears at 10, being formed with a peripheral rib 12 encircling the edge of the drum. An opening 14 serves for the passage of the brake anchor (not shown), which is clamped to the plate, while another opening 16 serves for the passage of the brake-applying connections, which are also clamped to the plate.

In order to prevent the drumming noise often heard in plates of this character, by preventing the vibrations, the plate is slotted radially at points 18 and 20, between openings 14 and 16.

While one illustrative embodiment has been described, it is not my intention to limit the scope of the invention to that particular embodiment, or otherwise than by the terms of the appended claims.

I claim:

1. A backing plate for a brake constructed to be clamped by an anchor and by brake-applying means and radially slotted between the positions of the anchor and said means to prevent vibrations causing drumming.

2. A backing plate for a brake having openings for an anchor and for brake-applying means, and radially slotted between the openings for the anchor and said means to prevent vibrations causing drumming.

In testimony whereof I have hereunto signed my name.

ADIEL Y. DODGE.